United States Patent [19]

Garcia-Mallol et al.

[11] Patent Number: 4,809,625
[45] Date of Patent: Mar. 7, 1989

[54] METHOD OF OPERATING A FLUIDIZED BED REACTOR

[75] Inventors: Juan A. Garcia-Mallol, Morristown; Michael G. Alliston, Newark, both of N.J.

[73] Assignee: Foster Wheeler Energy Corporation, Clinton, N.J.

[21] Appl. No.: 163,210

[22] Filed: Feb. 26, 1988

Related U.S. Application Data

[63] Continuation of Ser. No. 15,572, Feb. 13, 1987, abandoned, which is a continuation of Ser. No. 763,116, Aug. 7, 1985, abandoned.

[51] Int. Cl.[4] .............................................. F23D 1/00
[52] U.S. Cl. .................................. 110/347; 110/245; 122/4 D
[58] Field of Search .................... 60/39.464, 39.02; 122/4 D; 431/170, 7; 110/244, 245, 263, 347

[56] References Cited

U.S. PATENT DOCUMENTS

| | | | |
|---|---|---|---|
| 4,223,529 | 9/1980 | Willyoung | 122/4 D |
| 4,306,411 | 12/1981 | Zoll | 60/39.464 |
| 4,312,301 | 1/1982 | Anson | 122/4 D |
| 4,442,795 | 4/1984 | Strohmyer, Jr. | 122/4 D |
| 4,442,797 | 4/1984 | Strohmyer, Jr. | 122/4 D |
| 4,453,495 | 6/1984 | Strohmyer, Jr. | 110/245 |
| 4,462,205 | 7/1984 | Giles et al. | 60/39.464 |
| 4,469,050 | 9/1984 | Korenberg | 122/4 D |
| 4,473,033 | 9/1984 | Strohmyer, Jr. | 122/4 D |
| 4,538,549 | 9/1985 | Strömberg | 110/245 |
| 4,552,097 | 11/1985 | Jarmuzewski | 122/4 D |
| 4,597,774 | 7/1986 | Garcia-Mallol et al. | 431/7 |

FOREIGN PATENT DOCUMENTS

| | | | |
|---|---|---|---|
| 27818 | 3/1981 | Japan | 110/245 |
| 41430 | 3/1982 | Japan | 60/39.464 |

OTHER PUBLICATIONS

Fields et al, "Control & Instrumentation of a Fluidized Bed Burner", *Conference: Proceedings of the 14th Intersociety Energy Conversion Engineering Conference,* Boston, Mass., 8-79 (pp. 928-932).

*Primary Examiner*—Donald E. Stout
*Attorney, Agent, or Firm*—Marvin A. Naigur; Warren B. Kice

[57] ABSTRACT

A method of operating a fluidized bed reactor in which a bed containing solid particulate material is fluidized by introducing air into the bed. A gas column is formed containing a mixture of the air, the gaseous products of combustion or gasification of the fuel in the bed and the particulate material entrained by the air and the gaseous products of combustion. The mixture is discharged from the vessel and the particulate material is separated from the mixture and returned to the bed. The entrainable particulate material is maintained in the bed and in the gas column in quantities sufficient to saturate the gas column. The temperature of the fluidized bed is controlled by varying the amount of air introduced into the bed.

10 Claims, 2 Drawing Sheets

METHOD OF OPERATING A FLUIDIZED BED REACTOR

This application is a continuation of application Ser. No. 015,572, filed Feb. 13, 1987 which is a continuation of Ser. No. 763,116, filed Aug. 7, 1985, both now abandoned.

BACKGROUND OF THE INVENTION

This invention relates to a method of operating a fluidized bed reactor, and, more particularly, to such a method in which heat is generated by the combustion of fuel in a fluidized bed.

Fluidized bed reactors, combustors, or gasifiers, are well known. In these arrangements, air is passed through a bed of particulate materials, including a fossil fuel such as coal and an adsorbent for the sulfur generated as a result of combustion of the coal, to fluidize the bed and to promote the combustion of the fuel at a relatively low temperature. When the heat produced by the fluidized bed is utilized to convert water to steam, such as in a steam generator, the fluidized bed system offers an attractive combination of high heat release, high sulfur adsorption, low nitrogen oxides emissions and fuel flexibility.

The most typical fluidized bed combustion system is commonly referred to as a bubbling fluidized bed in which a bed of particulate materials is supported by an air distribution plate, to which combustion-supporting air is introduced through a plurality of perforations in the plate, causing the material to expand and take on a suspended, or fluidized, state. In the event the reactor is in the form of a steam generator, the walls of the reactor are formed by a plurality of heat transfer tubes. The heat produced by combustion within the fluidized bed is transferred to a heat exchange medium, such as water, circulating through the tubes. The heat transfer tubes are usually connected to a natural water circulation circuitry, including a steam drum, for separating water from the steam thus formed which is routed to a turbine to generate electricity or to a steam user.

In an effort to extend the improvements in combustion efficiency, pollutant emissions control, and operation turn-down afforded by the bubbling bed, a fluidized bed reactor has been developed utilizing the fast fluidized bed process. According to this process, fluidized bed densities between 5 and 20% volume of solids are attained which is well below the 30% volume of solids typical of the bubbling fluidized bed. The formation of the low density fast fluidized bed is due to its small particle size and to a high solids throughput, which requires high solids recycle. The velocity range of a fast fluidized bed is between the solids terminal, or free fall, velocity and a velocity which is a function of the throughput, beyond which the bed would be converted into a pneumatic transport line. For each solids circulation rate of flow there is a maximum velocity, beyond which said conversion of the fluidized bed to pneumatic transport occurs.

The high solids circulation required by the fast fluidized bed makes it insensitive to fuel heat release patterns, thus minimizing the variation of the temperature within the combustor or gasifier, and therefore decreasing the nitrogen oxides formation. Also, the high solids loading improves the efficiency of the mechanical device used to separate the gas from the solids for solids recycle. The resulting increase in sulfur adsorbent and fuel residence times reduces the adsorbent and fuel consumption. Furthermore, the fast fluidized bed inherently has more turndown than the bubbling fluidized bed.

However the fast fluidized bed process is not without problems. For example, the particulate fuel and adsorbent material used in a fast fluidized bed process must be relatively fine therefore requiring further crushing and drying of the particulate material, which is expensive. Also, the bed height required for adequate adsorption of the sulfur will be greater than that in a conventional bubbling fluidized bed system, which further adds to the capital expense and operating costs.

SUMMARY OF THE INVENTION

It is therefore an object of the present invention to provide a method of operating a fluidized bed reactor in which a wide range of fuel and adsorption particle size can be utilized.

It is a still further object of the present invention to provide a method of operating a fluidized bed reactor in which adequate adsorption is achieved with a reduced bed height.

It is a still further object of the present invention to provide a method of operating a fluidized bed reactor in which a gas column is formed in the fluidized bed boiler which is saturated with particulate material.

It is a still further object of the present invention to provide a method of operating a fluidized bed reactor in which the particulate material in the gas column is collected and essentially the same amount returned to the fluidized bed to maintain the saturated gas column.

It is a still further object of the present invention to provide a method of operating a fluidized bed reactor in which the volume of solids contained in the boiler furnace is relatively high, compared to the bubbling fluidized bed.

It is a still further object of the present invention to provide a method of operating a fluidized bed reactor in which the temperature of the fluidized bed is varied by varying the amount of air introduced into the bed.

It is a still further object of the present invention to provide a method of operating a fluidized bed reactor in which cooling surfaces are provided in contact with the bed and the gas column.

It is a still further object of the present invention to provide a method of operating a fluidized bed reactor which incorporates operating principles and advantages of both the bubbling fluidized bed and the fast fluidized bed.

Toward the fulfillment of these and other objects, the method of the present invention features the forming of a gas column above a fluidized bed which contains a mixture of air, the gaseous products of combustion from a fluidized bed, and particulate material entrained by the air and the gaseous products of combustion. The gas column is saturated with particulate material and the particulate material is separated from the mixture and injected back

BRIEF DESCRIPTION OF THE DRAWINGS

The above brief description as well as further objects, features and advantages of the method of the present invention will be more fully appreciated by reference to the following detailed description of presently preferred but nonetheless illustrative embodiments in accordance with the present invention when taken in conjunction with the accompanying drawing in which.

DESCRIPTION OF THE PREFERRED EMBODIMENT

Figure 1:
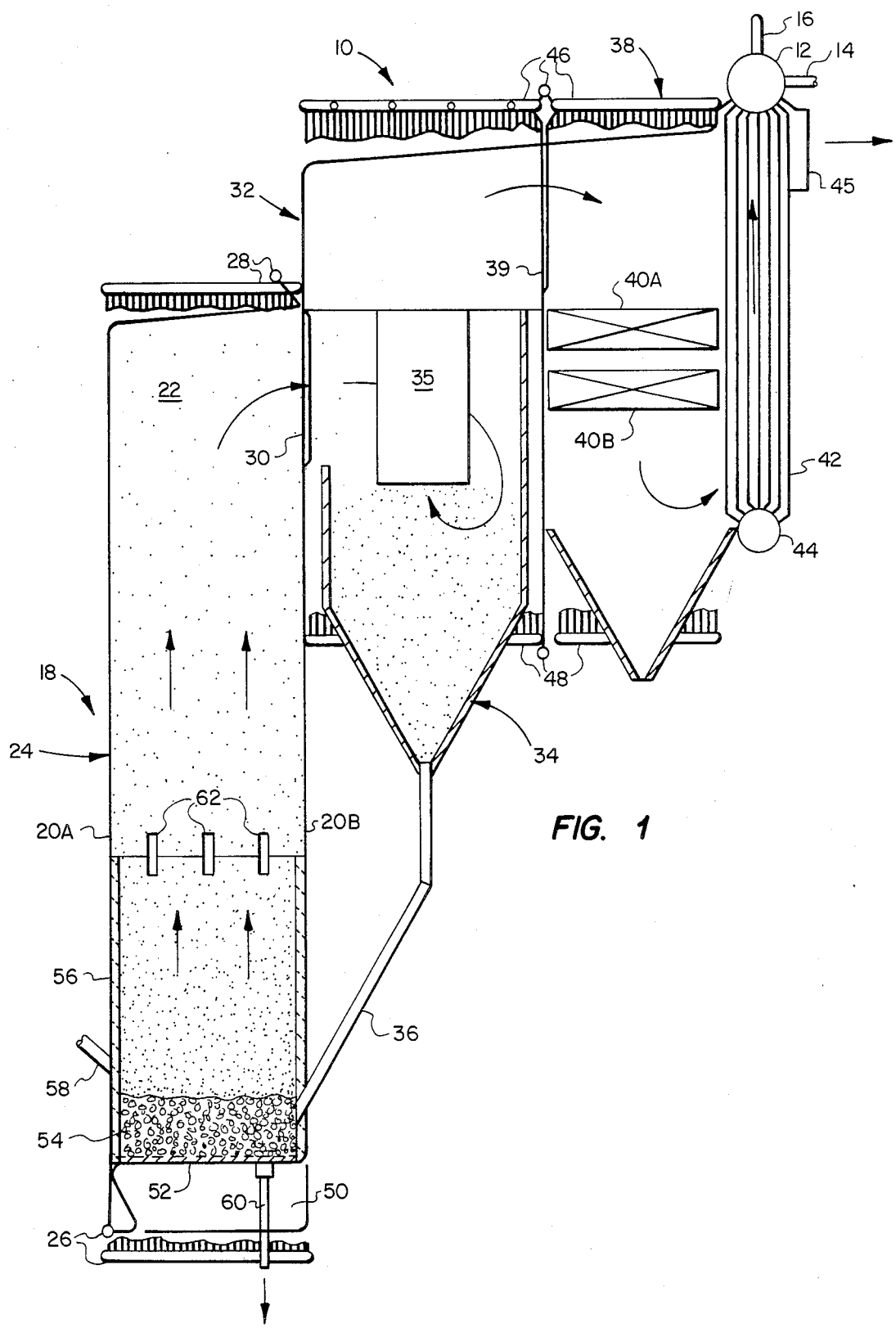
FIG. 1 is a schematic view depicting an atmospheric fluidized bed combustion section forming a part of a natural circulation steam generator.

The method of the present invention will be described in connection with a fluidized bed boiler forming a portion of natural water circulation steam generator, shown in general by the reference numeral 10 in FIG. 1 of the drawings.

The steam generator 10 includes a steam drum 12 which receives water from a feed pipe 14 and which discharges the steam generated via a plurality of steam pipes 16.

A fluidized bed boiler 18 is disposed adjacent the steam drum 12, and includes a front wall 20A, a spaced, parallel rear wall 20B, and two spaced sidewalls, one of which is shown by the reference numeral 22, which extend perpendicular to the front and rear walls to form a substantially rectangular furnace 24.

The walls 20A, 20B, and 22 of the boiler 18 are formed by a plurality of vertically-disposed tubes interconnected by vertically-disposed elongated bars, or fins, to form a contiguous, air-tight structure. Since this type of structure is conventional, it is not shown in the drawings nor will it be described in any further detail. The ends of each of the tubes of the walls 20A, 20B, and 22 are connected to horizontally-disposed lower and upper headers 26 and 28 for reasons that will be explained later.

An opening 30 is formed in the upper portion of the rear wall 20B by bending back some of the tubes (not shown) forming the latter wall to communicate the upper portion of furnace 24 with a separating section 32 disposed adjacent the boiler 18. A cyclone separator 34 forms the lower portion of the separating section 32 and includes a coaxially disposed tubular portion 35 which, together with the walls of the separator, form an annular flow path for the gases entering the separator from the boiler 18. The latter gases swirl around in the annular chamber to separate the entrained solids therefrom by centrifugal forces, before the gases pass to the upper portion of the separating section. The separated solids fall into a lower hopper portion of the separator 34 and are passed back into the boiler 18 by a recycle conduit 36, as will be described in further detail.

A heat recovery enclosure 38 is formed adjacent the separating section 32 and has an opening 39 formed in an upper wall portion which receives the clear gases from the separating section. A pair of superheaters 40A and 40B are disposed in the heat recovery enclosure 38 in the path of the gases, and each superheater consists of a plurality of tubes connected in a flow circuitry for passing steam through the tubes in a conventional manner to remove heat from the gases.

A boiler bank in the heat recovery enclosure 38 is formed by a series of parallel tubes 42 connecting the steam drum 12 to a water drum 44 for transferring water to the latter drum under conditions that will be described later. A gas flow passage is provided adjacent the tubes 42 and an outlet 45 is provided for the gas.

The walls forming the upper portions of the separating section 32 and the heat recovery enclosure are formed by a plurality of vertically disposed tubes interconnected by vertically disposed elongated bars, or fins to form a contiguous, wall-like structure identical to the walls forming the boiler 18. The upper ends of these walls are connected to a plurality of horizontally-extending upper headers 46, and the lower ends of the walls are connected to a plurality of horizontally extending lower headers, one of which is shown by the reference numeral 48.

Although not shown in the drawing it is understood that water flow circuitry, including downcomers and the like, are provided to connect the steam drum 14 and/or the water drum 44 to the headers 26, 28, 46, and 48 to form a flow circuit for the water and steam through the steam drum 12, the water drum 44 and the walls forming the boiler 18, the separating section 32 and the heat recovery enclosure 38. Since this is a conventional technique it will not be described any further.

A plenum chamber 50 is disposed at the lower portion of the boiler 18 into which pressurized air from a suitable source (not shown) is introduced by conventional means, such as a forced-draft blower, or the like.

A perforated air distribution plate 52 is suitably supported at the lower portion of the combustion chamber of the boiler 18, and above the plenum chamber 50. The air introduced through the plenum chamber 50 passes in an upwardly direction through the air distribution plate 52 and may be preheated by air preheaters (not shown) and appropriately regulated by air control dampers as needed. The air distribution plate 52 is adapted to support a bed 54 of a particulate material consisting, in general, of crushed coal and limestone, or dolomite, for adsorbing the sulfur formed during the combustion of the coal.

The inner surfaces of the lower portion of the walls 20A, 20B, and 22 of the boiler 18, are lined with a refractory 56, or other suitable insulating material, which extends a predetermined distance above the air distribution plate 52.

A fuel distributor 58 extends through the front wall 20A for introducing particulate fuel onto the upper surface of the bed 54, it being understood that other distributors can be associated with the walls 20A, 20B and 22 for distributing particulate sorbent material and/or additional particulate fuel material onto the bed 54, as needed.

A drain pipe 60 registers with an opening in the air distribution plate 52 and extends through the plenum 50 for discharging spent fuel and sorbent material from the bed 54 to external equipment.

A multiplicity of air ports 62 are provided through the sidewall 22 at a predetermined elevation from the bed 54 to introduce secondary air into the boiler for reasons to be described. It is understood that additional air ports at one or more elevations can be provided through the walls 20A, 20B, and the other sidewall as needed.

In the operation of the steam generator 10, a portion of the particulate material in the bed 54 is fired by introducing air, into the plenum chamber 50. A quantity of start-up coal is introduced through the distributor 58 and is spread over the upper surface of the particulate material in the bed 54. The coal within the bed 54 and the start-up coal are ignited by burners (not shown) positioned within the bed and, as the combustion of the coal progresses, additional air is introduced into the plenum chamber 50 at a relatively high pressure and velocity. Alternatively, the bed 54 can be warmed up by a burner located in the plenum 50. The primary air introduced through the plenum chamber 50 comprises a fraction of the total air required for complete combustion so that the combustion in the lower section of the furnace 24 is incomplete. The latter section thus operates under reducing conditions and the remaining air required for complete combustion is supplied by the air ports 62. The range of air supplied through the plenum 50 can be from 40% to 90% of that required for complete combustion while the remaining air (60% to 10%) is supplied through the ports 62.

The high-pressure, high velocity, combustion-supporting air introduced through the air distribution plate 52 from the plenum chamber 50 causes the particles of the relatively-fine particulate material, including the fine particles of coal ash and spent limestone, to become entrained within and to thus be pneumatically transported by the combustion gases. This mixture of entrained particles and gas rises upwardly within the furnace 24 to form a gas column containing the entrained solids and passes from the boiler 18 through the opening 30 and into the separating section 32.

Figure 2:
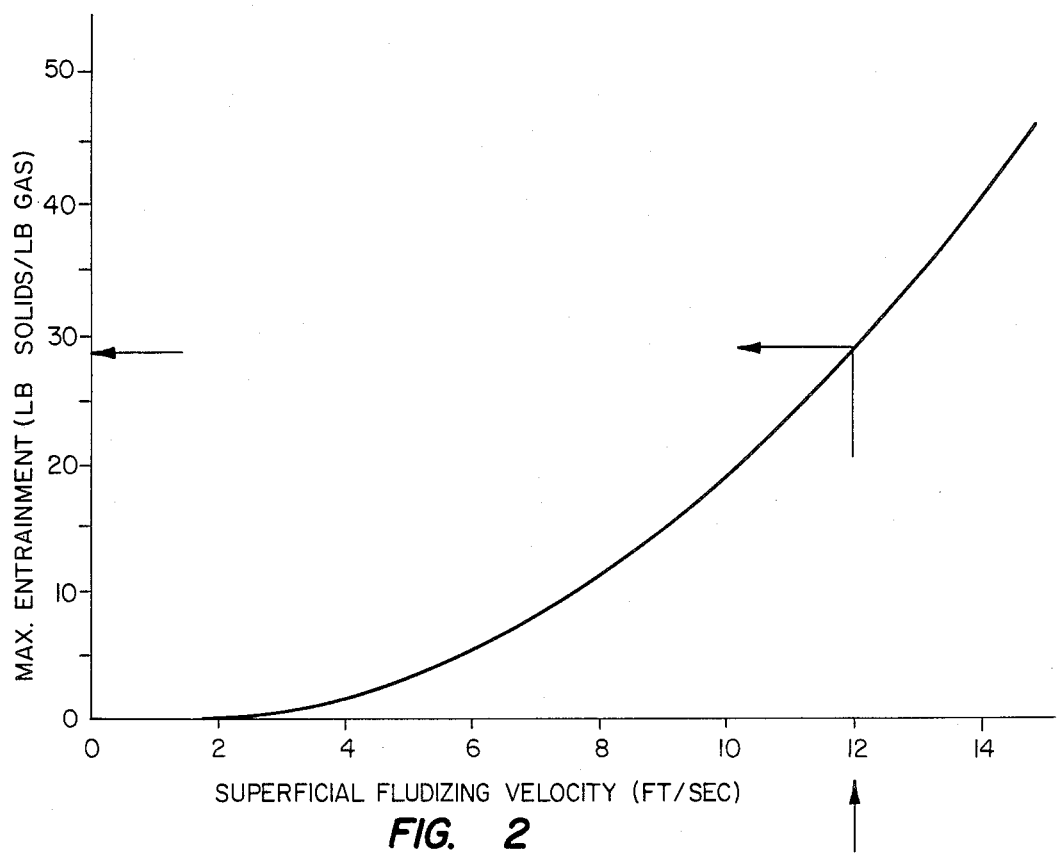
FIG. 2 is a graph depicting an example of the relationship between the fluidizing air velocity and the solids entrainment.

According to a feature of the present invention, the gas column formed in the furnace 24 above the bed 54 is saturated with the solid material, i.e. maximum entrainment of the solid materials by the gas is attained. The maximum solids entrainment as a function of fluidizing velocity is shown in FIG. 2. In applying FIG. 2, the fraction of bed material of size that can be transported by the gases has to be taken into consideration, as well as the partial segregation of coarser material. As shown in FIG. 2, the solids entrainment at a 12 feet per second fluidizing velocity is about 28 pounds per pound of gas, but it becomes about 10 pounds once said considerations are made. As a result of the saturation, a portion of the fine solids are retained in the bed 54, which nevertheless exhibits a relatively high percentage volume of solids, such as 20% to 30% of the total volume, when operating at maximum capacity.

The coarse particulate material is accumulated in the lower portion of the vessel along with a portion of the fine material, while the remaining portion of the fine material passes upwardly through the gas column. The relatively fine particles traveling the length of the gas column and exiting from the boiler 18 through the opening 30 are separated from the combustion gases within the separator 34, and are recycled back to the fluidized bed through the recycle conduit 36. This, plus the introduction of additional particulate fuel material through the distributor 58 maintains the saturated gas column above the bed 54.

Water is introduced into the steam drum 12 through the water feed pipe 14 where it mixes with water in the drum 12. Water from the drum 12 is conducted downwardly through the tubes 42 into the water drum 44 and, through downcomers or the like, into the lower headers 26 and the tubes forming the boiler walls 20A, 20B and 22, as described above. Heat from the fluidized bed, the gas column, and the transported solids converts a portion of the water into steam, and the mixture of water and steam rises in the tubes, collects in the upper headers 46, and is transferred to the steam drum 12. The steam and water are separated within the steam drum 12 in a conventional manner, and the separated steam is conducted from the steam drum by the steam pipes 16 to a steam turbine, or the like. The separated water is mixed with the fresh supply of water from the feed pipe 14, and is recirculated through the flow circuitry in the manner just described. Other cooling surfaces, preferably in the form of partition walls with essentially vertical tubes, can be utilized in the furnace 24.

The hot clean gases from the separating section 32 pass over the superheaters 40A and 40B and the tubes 42 to remove additional heat from the gases and add heat to the water flowing through the latter tubes, before the gases exit from the steam generator, via the outlet 45. If the air which is introduced into the plenum 50 is at a relatively high pressure on the order of 10 atmospheres, the gases from the outlet 39 may be directed to a gas turbine, or the like (not shown).

Figure 3:
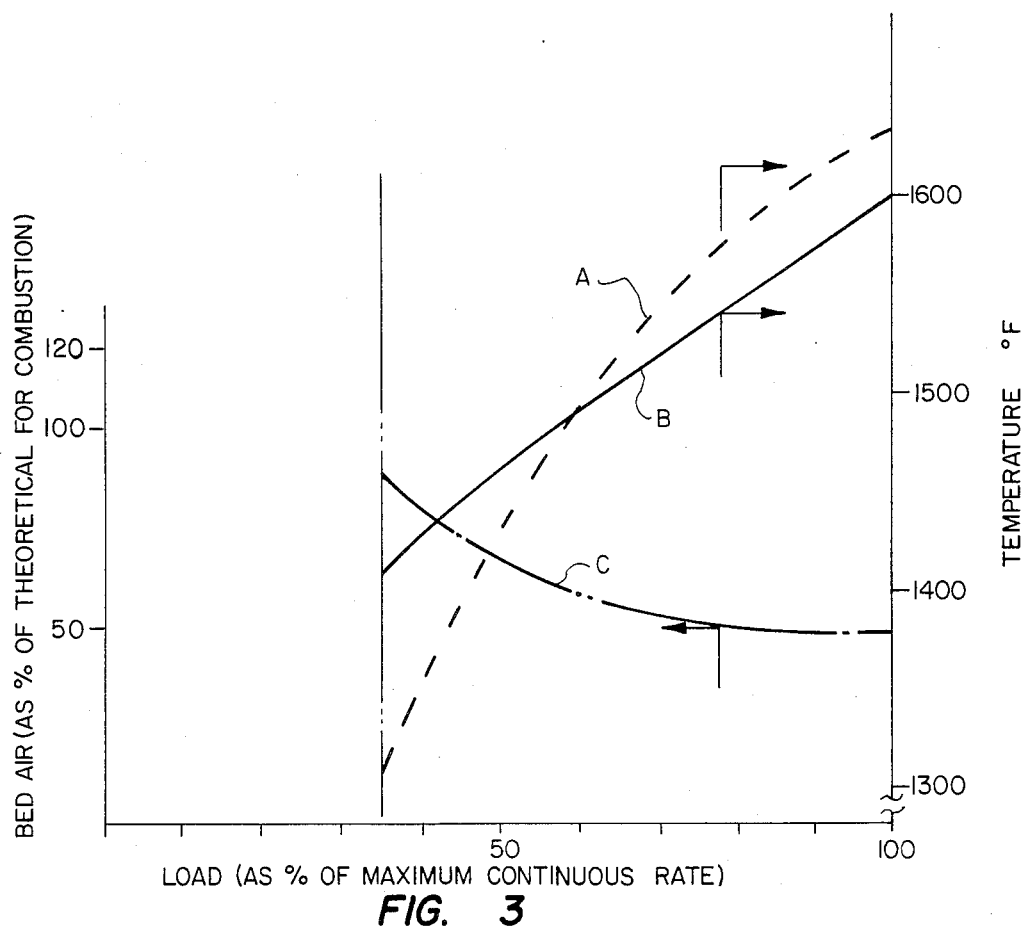
FIG. 3 is a graph depicting an example of the relationship between load, percentage of air, bed temperature and furnace exit temperature.

In response to changes in load of the steam turbine, the temperature of the bed 54 is maintained at a preset acceptable value by changing the amount of air supplied to the boiler via the air plenum 50 and the air ports 62, as shown in the graph of FIG. 3, which depicts variations, as a function of load, of the temperatures and of the percentage of theoretical air for combustion supplied to the air plenum 50. The curve referred to by the reference letter A in FIG. 3 is a plot of the temperature of the mixture of gases and entrained solid particles as they exit from the gas column in the boiler 18 through the opening 30. As shown, the latter temperature increases with increases in load.

Curve B depicts the substantially direct proportional relationship between bed temperatures and load, while curve C shows the variations in the air added to the bed as a percentage of the theoretical air for combustion, with changes in load.

It is thus seen that the method of the present invention incorporates operating principles of both the bubbling fluidized bed system and the fast fluidized bed system and therefore results in several advantages. For example, the relatively high amount of lateral mixing of the particulate materials within the fluidized bed is similar to the mixing attained by the bubbling fluidized bed. In addition, the fine particulate material is retained in the reacting zone, as in the case of a fast fluidized bed, and fuel and adsorbent having a wider range of particle size can be utilized. Also, a smaller static bed height and much smaller expanded bed height than those of the fast fluidized bed are possible. This, in conjunction with the overfire air discharging above the fluidized bed, results in a smaller power requirement for the air fans and less important mechanical forces due to bed pressure variations. Further, the majority of the reactions between solid and gas, including the combustion in particular, occur only below the overfire air ports, therefore minimizing carbon monoxide and hydrocarbon emissions. Also in conjunction with the preceding advantage, staging of the air with an important overfire air fraction reduces the nitrogen oxides emissions. In addition, the use of refractory material, preferably of the high conductivity type, is possible below the overfire air, where the surfaces face reducing gases, and in erosion-prone locations elsewhere. Further, no active control of the solids circulation rate of flow by the solids recycle system is necessary, because the continuous maintenance of the saturated gas column limits the solids circulation. Also, by providing for extraction of relatively small amounts of the particulate solids from the recycle system, as well as the fuidized bed tap, the residence time of the coarse and fine particulate solids in the system can be adjusted to suit their reacting characteristics.

Although not specifically illustrated in the drawings, it is understood that other additional ad necessary equipment and structural components will be provided, and that these and all of the components described above are arranged and supported in an appropriate fashion to form a complete and operative system.

It is also understood that variations may be made in the method of the present invention without departing from the scope of the invention. For example, the fuel supplied to the boiler can be in liquid or gaseous form rather than in the particulate solid form as described. Of course, other variations can be made by those skilled in the art without departing from the invention as defined in the appended claims.

What is claimed is:

1. A method of operating a fluid bed reactor comprising the steps of introducing relative coarse and relatively fine solid fuel particles into a vessel for combustion, introducing air into said vessel and through said particle to fluidize said sulfur absorbent particles and support said combustion, controlling the velocity of said air so that it is sufficient to entrain the relatively fine particles and insufficient to entrain the relatively coarse particles so that said coarse particles form a discrete fluidized bed in the lower portion of said vessel, said air and entrained fine particles mixing with the gaseous products of combustion and rising towards the upper portion of said vessel, separating said fine particles from said mixture, returning the separated fine particles back to said vessel, discharging the spent particles from said vessel, and controlling the quantity of said fine particles introduced into said vessel and returned to said vessel so that they are in excesss of that sufficient to saturate the gases in said mixture so that a portion of said fine particles accumulates in said discrete bed of coarse particles.

2. The method of claim 1 wherein said air is introduced in quantities below that required for complete combustion of said fuel, and further comprising the steps of introducing an additional quantity of air to said vessel at a location above the area of introduction of said first quantity of air, the quantity of said additional air being sufficient to completely combust said fuel.

3. The method of claim 1 further comprising the step of controlling the temperature of said bed by varying the quantity of air introduced into said bed.

4. The method of claim 1 further comprising the step of varying the rate of said discharge of said spent particles to adjust the residence time of said particles in said vessel.

5. The method of claim 1 wherein said air is introduced at a velocity which is greater than the free fall velocity of said fine particles and less than the free fall velocity of said coarse materials.

6. The method of claim 1 wherein the volume of solids accumulating in said bed is between 20 and 30 percent of the volume of said vessel when the reactor is operating at maximum capacity.

7. The method of claim 1 wherein the velocity of the air introduced to the bed is approximately 12 feet per second when the reactor is operating at maximum capacity.

8. The method of claim 1 further comprising the step of circulating water through the walls of said vessel to absorb the heat from said combustion and convert said water to steam.

9. The method of claim 1 wherein said particles also include an adsorbent for adsorbing the sulfur formed during the combustion of said fuel.

10. The method of claim 1 wherein said air is introduced into said vessel below said particles so that it passes upwardly through said bed.

* * * * *

UNITED STATES PATENT AND TRADEMARK OFFICE
CERTIFICATE OF CORRECTION

PATENT NO. : 4,809,625

DATED : March 7, 1989

INVENTOR(S) : Juan A. Garcia-Mallol and Michael G. Alliston

It is certified that error appears in the above-identified patent and that said Letters Patent is hereby corrected as shown below:

In the claims:

At Column 7, claim 1, line 18, after "fuel" add -- and sulfur absorbent --;

At Column 7, line 20, delete "sulfur absorbent".

Signed and Sealed this

Second Day of January, 1990

Attest:

JEFFREY M. SAMUELS

Attesting Officer     Acting Commissioner of Patents and Trademarks